3,364,042
GLASS COMPOSITION AND METHOD
Arthur B. Swain and Hossein R. Keshari, Toledo, Ohio, assignors to Owens-Illinois, Inc., a corporation of Ohio
Filed Dec. 20, 1965, Ser. No. 514,797
9 Claims. (Cl. 106—52)

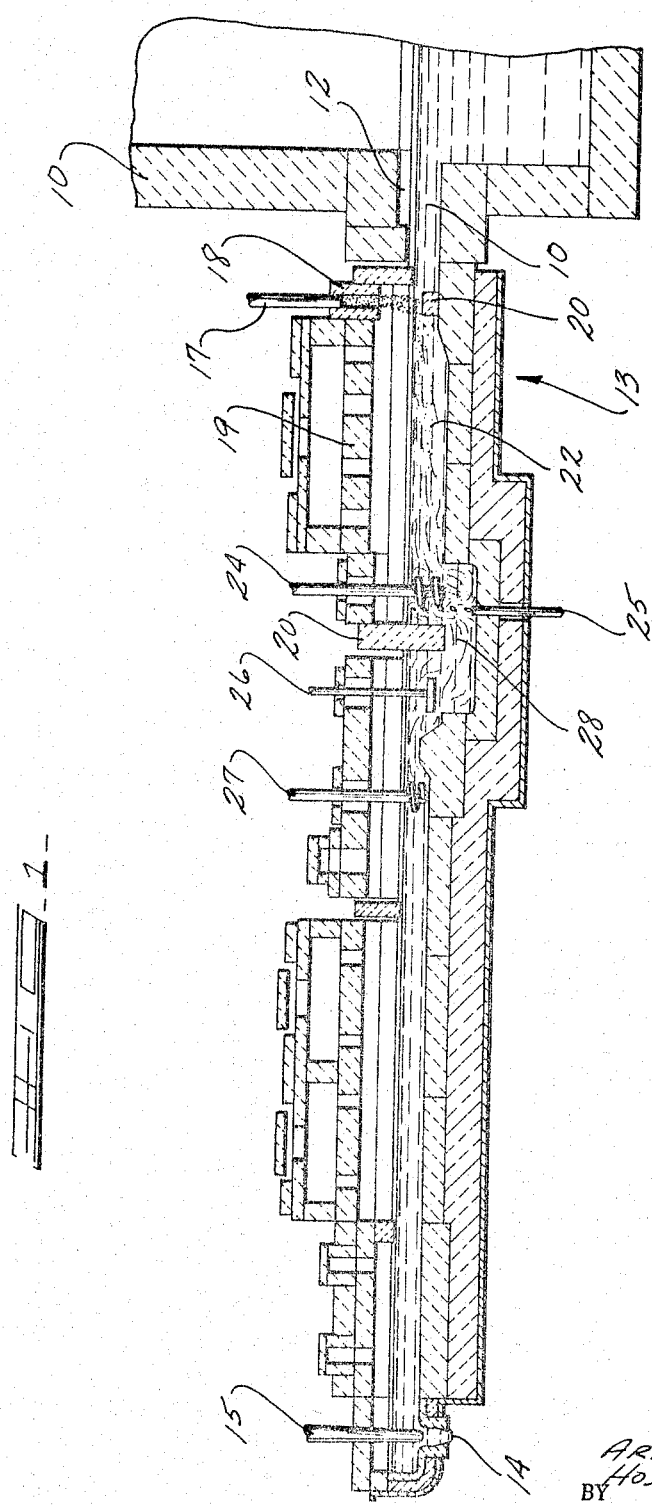

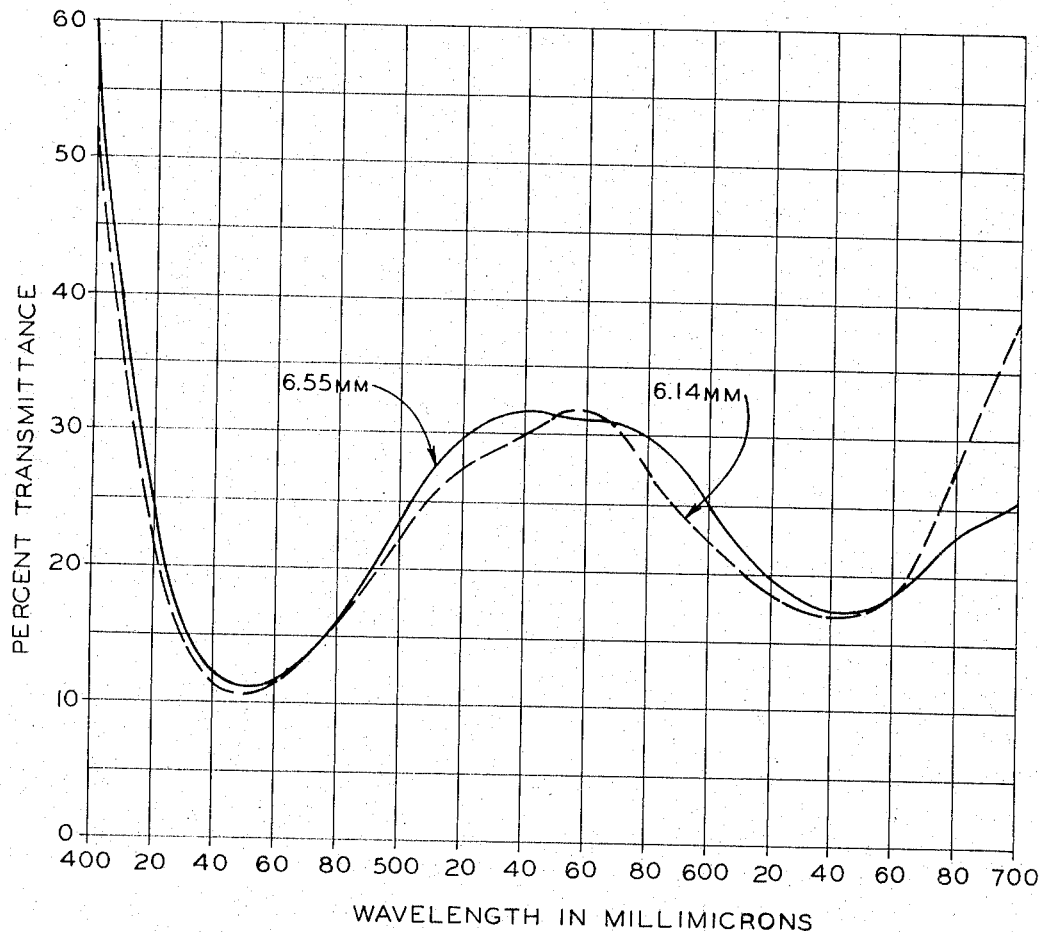

This invention relates to the manufacture of colored glass. More particularly, the invention relates to highly colorant enriched green frit glass batch compositions and to the vitreous compositions made therefrom. Also, the invention relates to a method of manufacturing green composite glasses using said green frit glass of the invention. One specific embodiment of the invention relates to the manufacture of a commercial colored glass known as champagne green.

In conventional operations for producing colored glasses, one of the very substantial problems encountered is in changing a glass melting tank over from one color to another or from a colorless to a colored glass making operation.

The problem arises from the fact that, for example, the first color composition must be dumped and the tank refilled with a second color composition. Usually the tank change is so scheduled as to permit product run-out over as large a portion of the transition as possible. However, there is an intermediate interval of one to three days duration wherein the prior color tails out and the new color begins, in which the glass composition is in transition, and as such must be dumped. This transition glass is off-color. Considering the fact that glass melting tanks hold up to 100 tons of melt or more, it will be understood that the transition caused by dumping is very expensive.

This, of course, brings to mind an ideal situation where a colorless base glass composition would be used in the tank and colorant as desired added at the forehearth to fulfill specific end color requirements. By so operating, the conditions of firing of the tank and the feeding of batch ingredients into the tank would all become fixed factors. Careful adjustment and stabilization of tank conditions would lead to the production of high quality products. The tank conditions, once stabilized, would remain so and variables would be avoided.

Such a forehearth coloring method has important advantages over the tank method for producing colored glass, in which the colorant material is added to the base glass batch and introduced directly into the melting and refining tank. Thus, by the forehearth method, as many colors can be produced simultaneously as there are forehearths associated with the melting furnace.

Further, in a given forehearth, a transition from one color to another can be made in a matter of one to three hours as contrasted to a matter of one to three days to change a tank from one color to another.

Also, if desired, both clear and colored glassware can be made simultaneously from the same melting tank, by using different forehearths, and adding colorant frit glass to some, and running the clear base glass through others.

In manufacturing the green glass by techniques of the present invention, it is desirable to achieve high pulls or production rates from a selected forehearth or forehearths utilizing the invention. This may be achieved up to 40 tons per operating day under the one modification herein disclosed.

Further, smaller quantities of colorant materials are required by the forehearth coloring method than by the known melting tank practice where the colorant is incorporated into the tank batch and melted with substantial losses of volatile colorant materials during the extended melting and refining operation.

Additionally, the manufacture of dark champagne-green glasses by conventional methods has presented serious economic problems because of inefficient use of fuel. These dark glasses have an absorption band in the infrared range of the spectrum causing much of the radiant energy of the flames to be absorbed in the upper layer of molten glass. Since commercial melting furnaces are designed to accommodate a depth of several feet of molten glass, heat transmission is a serious problem. Since colorless flint glass has a high transmission characteristic in the near infrared region of the spectrum, the present invention permits a substantial reduction in the melting costs by permitting the dark green colorants to be added after the melting has been completed.

Colored glasses are important in the glass industry as a good color improves the appearance of the glass and of the articles or products packaged in glass containers and enhances their sale in a competitive market. Various colors and shades of colors are produced commercially and are known in the trade by various trade names, as for example, Georgia green, Emerald green and Champagne green.

In developing a champagne green by the above method in which the colorant is added within the forehearth, considerable difficulty has been experienced owing to detrimental effect of any unreduced $CrO_3$ that may be present.

Presently, the commercial optical standards for champagne green are:

Dominant wavelength $m\mu$ _____ 560–564
Purity, percent _____ 40–50
Brightness, percent _____ 12–20

When a glass of this color description is prepared by conventional methods utilizing a single melting operation in a continuous furnace system, it is possible to achieve a soda-lime glass within the desired color specifications through the incorporation of the following colorants in the approximate percentages shown:

| | Percent |
|---|---|
| $Cr_2O_3$ | 0.07–0.09 |
| $CrO_3$ | None |
| NiO | 0.06 |
| CoO | 0.004 |

These colorants are standard in the industry.

This combination of colorants is possible because all of the $CrO_3$ can be reduced to $Cr_2O_3$ under carefully controlled conditions in the melting furnace. It is known that $Cr_2O_3$ contributes the strong green coloration while any unreduced $CrO_3$ produces an undesirable yellow cast. The function of the NiO is to darken the green coloration resulting from the $Cr_2O_3$. The CoO is added to mask the yellow cast that would result from any unreduced $CrO_3$. This is because there is generally a very minute quantity of $CrO_3$ present in the final glass even though it cannot be detected by conventional analytical means.

When champagne green is prepared by the forehearth technique (i.e., adding a green colorant enriched frit to a colorless base glass in the forehearth of a conventional furnace) it is very difficult to prevent some the the $Cr_2O_3$ present in the frit from oxidizing to $CrO_3$ upon interaction with the base glass during the forehearth addition. This requires that additional CoO be added to mask the yellow produced by this additional $CrO_3$ formed during forehearth addition. When enough CoO is added to the frit to bring the composite glass coloration with the specified dominant wavelength, the color purity falls below the specified range. In other words, the glass becomes too dark. For this reason, champagne green cannot be prepared by the forehearth technique using the conventional combination of colorants. The cause of the partial oxidation from $Cr_2O_3$ to $CrO_3$ during the forehearth addition is not completely understood, but it is suspected to be a result of the interaction of the $Cr_2O_3$ in the frit glass with the fining and decolorizing agents in the base glass at the prevailing forehearth temperatures under the influence of the ambient oxidizing conditions. In any event, we have found that the use of CoO as a masking agent for yellow is entirely unsatisfactory for commercial production of champagne green glass by the forehearth addition technique.

Therefore, a substantial contribution to the art of colored glass manufacture would be provided by highly enriched colored frit glasses for addition to colorless base glasses to produce commercially acceptable champagne green which has not been done before; further, a contribution to the art would be provided by a method for producing such composite green glass.

It is therefore an object of the present invention to provide a novel green colorant frit glass particularly adapted to produce a composite glass within the commercial specification of champagne green when admixed with substantially colorless base glasses.

Another object is to provide commercial acceptable cahmpagne green composite glasses that do not require the use of cobalt oxide as a colorant.

Another important object is to provide a method of adding the green frit glass to the bulk stream of a molten base glass while the molten glass is flowing through the forehearth of a conventional melting furnace.

Still another object is to provide green frit glass compositions that are capable of admixing with colorless soda-lime base glasses in the forehearth of a conventional furnace to form commercially acceptable champagne green glasses so as to permit pull rates of up to 40 tons of finished glass per operating day.

In attaining the objects of this invention, one feature resides in the preparation of a frit glass containing in addition to the ordinary glass forming oxides, sufficient $Cr_2O_3$, CuO and NiO in proper combination to produce champagne green when admixed with a substantially colorless soda-lime base glass. The frit glass also contains sufficient alkali oxides and other fluxes such as boric oxide to facilitate the dissolution of $Cr_2O_3$.

Another feature resides in admixing the aforesaid frit under proper conditions of agitation, in a forehearth of a commercial glass melting furnace, with an essentially colorless soda-lime base glass composition to produce the desired champagne green coloration.

The above and other objects, features and advantages of the present invention will become apparent to those skilled in the art upon reading the detailed description contained herein.

The specific problem presented to the art was to develop a colored frit glass that would yield a composite glass within the color specifications of champagne green when admixed with a soda-lime base glass. Initial experimentation demonstrated that a colored composite glass within the specifications of champagne green could not be produced by the forehearth technique utilizing the standard industrial colorants ($Cr_2O_3$, NiO and CoO) in the frit glass. We found that during the forehearth addition of the frit glass to the base glass, part of the $Cr_2O_3$ was oxidized to $CrO_3$ under the normal conditions of oxidation existing in the forehearth. When sufficient CoO was added to neutralize the yellow cast produced by the $CrO_3$, the color purity was lowered below the commercial specification. Rather than remove the ambient air from the forehearth and replace it with a neutral or reducing atmosphere, the problem was approached from a standpoint of finding a colorant to replace the CoO as a toning agent for the green resulting from the $Cr_2O_3$ while at the same time masking the undesirable yellow color resulting from any $CrO_3$ that would be formed under the oxidizing forehearth conditions. It is important that this colorant cost no more than the CoO it would replace. We have discovered that a specified range of copper oxide as a replacement for the cobalt oxide in the frit glass would serve to give the resulting composite glass the proper green cast while at the same time masking the yellow color that inevitably forms during the forehearth addition under the ambient oxidizing conditions. In addition, the composite glass was unexpectedly found to be within the commercial specifications of champagne green from a color purity standpoint. The problem then was solved by replacing the cobalt oxide with a critical amount of copper oxide. The following description demonstrates in detail how the present invention can be practiced.

FIGURE 1 is a longitudinal sectional elevation of a preferred form of apparatus for use in practicing our invention.

The base glass is melted and refined in the furnace tank 10. The molten glass 11 flows through the furnace outlet 12 into the channel provided by the forehearth 13. The forehearth is provided at its forward end with an outlet 14 or other means for the discharge of the glass which may be under the control of plunger 15. The plunger may be operated to control the volume of glass passing through the outlet 14 either by adjustment with respect to the outlet to control the flow therethrough, or by reciprocation thereover to discharge gobs of glass therethrough.

The green frit glass is fed to the surface of the glass in the forehearth channel from a feeder tank (not shown) through the discharge spout 17. Discharge blocks 18, built into the upper wall or roof of the forehearth 19, are formed with vertical channels in register with the spout 17 through which the frit fall by gravity into the forehearth. The frit which is in powdered or granulated form is spread over the surface of the flowing glass. The frit falls on the glass directly over a dam 20 of Zac or other refractory material. The dam serves to produce a comparatively rapid local surface flow of the glass which aids in admixing the frit and base glass.

The forehearth comprises a section or chamber 22, through which the frit is carried and in which it is melted. The temperature in this section must be at least as high as the melting temperature of the frit and is usually maintained about 2200–2300° F.

In the well section 23, the temperature is generally lowered approximately 50° F. by the water cooled stirring members 26 and from this point on the glass it is gradually cooled to an average operating temperature at outlet 14 of about 2070° F. Means for effecting a thorough mixing of the melted frit with the base glass include a first set of stirrers 24, bubblers 25, a second set of stirrers 26 and a third set of stirrers 27. The forehearth is formed with a well 28 and a deep well skimmer 29 extending downward within the well.

In another form, the frit may be added in the molten state. It is therefore contemplated herein that the term "frit" may include either form of the colorant glass material.

The amount of frit entering the forehearth is usually only a small fraction of the amount of base glass flowing from tank 10, the proportion depending upon the composition of the frit, the intensity of the color desired in the end product, or other variable factors. In general, the amount of frit added usually varies from about 1% to about 5% by weight based on the amount of base glass.

The above described apparatus is only exemplary of several forms of apparatus which may be used in practicing the invention, and illustrates, rather schematically, the adoption of the method to existing forehearth constructions. For additional features of a suitable apparatus for mixing colorants in the glass furnace forehearth see U.S. Patent No. 3,057,175, to R. R. Rough and A. B. Swain, Jr., issued on Oct. 9, 1962.

THE FRIT GLASS OF INVENTION AND METHOD OF PREPARATION

TABLE I.—BATCH DATA FOR FRIT GLASS (IN POUNDS)

| Component | Example I | Example II | Example III | Operable Range |
|---|---|---|---|---|
| Sand | 2,000 | 2,000 | 2,000 | 2,000 |
| Soda Ash | 1,275 | 1,000 | 1,120 | 1,000–1,275 |
| Dehydrated Borax | 270 | 175 | 235 | 175–270 |
| Potassium Dichromate | 198 | 124 | 174 | 124–198 |
| Black Nickel Oxide | 131 | 82 | 115 | 82–131 |
| Black Copper Oxide | 89 | 56 | 78 | 56–89 |

TABLE II.—COMPOSITIONAL DATA FOR FRIT GLASS OF TABLE I IN PERCENT BY WEIGHT

| Theoretical Chemical Analysis | Ex. I | Ex. II | Ex. III | Operable Range |
|---|---|---|---|---|
| $SiO_2$ | 58.71 | 66.51 | 61.9 | 58–67 |
| $Al_2O_3$ | 0.14 | 0.16 | 0.15 | 0–1 |
| $Fe_2O_3$ (impurity) | 0.015 | 0.015 | .016 | 0–1 |
| $B_2O_3$ | 5.51 | 4.05 | 5.06 | 2–7 |
| $Na_2O$ | 24.27 | 21.18 | 22.45 | 15–25 |
| $K_2O$ | 1.90 | 1.36 | 1.73 | 0–5 |
| Total Cr as $Cr_2O_3$ | 3.02 | 2.14 | 2.80 | 2.1–3.1 |
| NiO | 3.79 | 2.69 | 3.50 | 2.6–3.8 |
| CuO | 2.63 | 1.87 | 2.43 | 1.8–2.7 |

TABLE III.—PREFERRED RANGE OF COLORANTS IN THE FRIT GLASS

Colorant: Preferred range percent
- $Cr_2O_3$ — 2.3–2.7
- $CrO_3$ — [1] 0–0.002
- NiO — 2.7–3.2
- CuO — 1.8–2.2

[1] Should be as low as conditions permit.

Example 1

In one specific embodiment of the present invention, the batch ingredients listed in the corresponding column of Table I, are fired in a frit furnace at a melting temperature of about 2750° F. To achieve the desired chromium concentration, all of the chromium is introduced as potassium dichromate. Hexavalent chromium is used because it is much more soluble in the alkaline soda-lime-flint system. The presence of the sodium oxide and boric oxide in the frit enhances the chromium dissolution. After complete dissolution, the $Cr^{+6}$ is essentially reduced to $Cr^{+3}$ through interaction with the nickel oxide, copper oxide and other oxidizable material present in the batch under conditions of about 0–½% excess oxygen in the melting chamber. The molten colorant glass is suitably converted to powdered frit by feeding as a stream from the outlet of the melting furnace and chilling rapidly. The chilling is effected by flowing the molten stream through water cooled rolls and then into a body of water so that the glass breaks up into granular frit form. If desired, the granular glass frit can then be further reduced in particle size by grinding. We have found the powdered frit glass particles in the range of −8+30 mesh size are satisfactory for the purposes of this invention.

As an alternative method the frit may be melted and directly fed into the forehearth as the molten colorant frit glass.

In any event, the theoretical composition of the frit glass based on the above mentioned batch charge is listed in the corresponding column of Table II. The preferred range of colorants is set forth in Table III. The preferred values are slightly less than the theoretical values because of the slight vaporization loss of colorant oxides during the frit melting operation. Therefore, the theoretical batch values are intentionally higher to allow for this slight vaporization loss on melting. It should be emphasized that it is desirable to have substantially all of the chromium in the frit glass and subsequently in the finished composite glass, present as $Cr_2O_3$ while the $CrO_3$ is held to a minimum.

Example II

The corresponding frit glass of Table I is prepared according to the method of Example I. Composition data is set forth in Table II and Table III.

Example III

The corresponding frit glass of Table I is prepared according to the method of Example I. Compositional data is set forth in Table II and Table III.

Before describing the manner in which frits of this invention are incorporated into colorless base glasses to produce champagne green composite glasses, a description of suitable base glasses and desired composite glass optical properties will be provided to serve as an appropriate background upon which the invention can be superimposed.

Base glasses that can be used in practicing the present invention may have an actual analysis of oxides encompassed within the ranges set out below. Generally, it will be found that glasses falling within these ranges are soda-lime-flint glasses commonly used in the manufacture of colorless containers.

RANGE OF OXIDES IN BASE GLASS COMPOSITIONS

| Constituent: | Percent by Weight |
|---|---|
| $SiO_2$ | 60–75 |
| $Al_2O_3$ | 0.3–10 |
| $CaO+MgO$ | 6–15 |
| $Na_2O$ | 12–18 |
| $K_2O$ | 0–5 |
| BaO | 0–5 |
| Decolorizer* | Trace |

*Any compatible decolorizer can be used. The function here is to mask the color produced by any iron that may be present as an impurity in the batch material. We have found that selenium in the range of 0.00025–0.00035% is effective.

TABLE IV.—SPECIFIC COMPOSITION OF A SUITABLE BASE GLASS

| Constituent: | Percent by weight |
|---|---|
| $SiO_2$ | 72.17 |
| $Al_2O_3$ | 1.60 |
| $Fe_2O_3$ | 0.032 |
| CaO | 12.39 |
| MgO | 0.15 |
| $Na_2O$ | 13.25 |
| $K_2O$ | 0.36 |
| Selenium | 0.00025–0.00035 |

The conditions and procedures for making the above base glass is conventional and such condition are well known to those skilled in the art as exemplified in Table IX B–II on pages 245 of "Handbook of Glass Manufacture" by Tooley, Ogden Publishing Company, New York, N.Y., 1953.

In accordance with the broad principles of the present invention, the frit glasses of the invention can be added to substantially any oxidized glass. Accordingly, the exemplary soda-lime-flint glass is suggested as applicable for commercial container production.

DESCRIPTION OF OPTICAL PROPERTIES

The optical properties hereinafter set forth are C.I.E. colorimetric values based upon the I.C.I. Chromaticity Diagram. C.I.E. refers to the First International Commission of Illumination and the diagram from which the values are taken defines color in terms of mixtures of theoretical color lights. The C.I.E. system makes possible the exact specification of colors by means of a "color map." The C.I.E. system of color notation specifies the color of glasses in terms of brightness, purity and dominant wavelength.

"Brightness" which is usually expressed in terms of percentage, is the amount of visual response to a normal observer to the radiation emergent from a transparent object relative to the response in this observer to the radiation incident upon this object. Thus, brightness may be briefly termed the lightness of color of an object.

"Purity" which is also normally expressed in terms of percentage is a measure of the monochromaticness of a color with monochromatic light having a purity of 100%. By diluting the monochromatic radiation with white light made up of all wavelengths, we thereby dilute the color and reduce purity.

"Dominant Wavelength" usually expressed in millimicrons ($m\mu$), is the wavelength of monochromatic light appearing to the eye to have the same hue as the mixed light actually encountered. These concepts will be hereinafter discussed in relation to the finished composite glass.

In the production of glass containers, a base glass is prepared in melting tanks of several hundred ton capacity. The batch constituents are added and proceed through the tank under melting and refining conditions. The glass is issued out of the fining end of the melting tank by being run through one or a plurality of forehearths which are provided in connection with the tank to feed the forming machines.

Generally, the colorless base glass issues from the melting tank into the forehearth at a temperature of about 2300° F. The frits made in accordance with the present invention are well adapted for addition to the base glass at such temperature conditions in finely divided form as from −8 to +30 mesh size. Stirring means and mixing baffles known in the art are used to produce homogeneous admixtures of the frit into the colorless base glass to produce a uniformly, highly colored composite glass. A specific type of forehearth equipped with stirring is set forth in aforesaid FIG. 1.

*Example IV*

To produce dark green composite glass within the commecial specifications of champagne green characteristic, the frit of Example III was added to the forehearth of a furnace producing the base glass listed in Table IV at the rate of about 55 lb. of frit glass per ton of base glass. In practice, the amount of frit glass desirably ranges from about 1% to about 5% of the amount of base glass flowing through the forehearth. The mixing was acomplished in an apparatus similar to that shown in FIG. 1. The frit was at ambient temperature and the base glass was about 2300° F. The green composite glass was then formed into glass containers by conventional forming equipment.

The composite glass so produced had the following characteristics:

|  |  | Preferred Range |
| --- | --- | --- |
| Dominant wavelength | 562.34 | 560-564 |
| Purity, percent | 44.57 | 40-50 |
| Brightness, percent | 13.24 | 12-20 |

Optical measurements refer to 10 mm. thickness sample.

A complete color profile for the composite of invention is given in FIG. 2. Also included in FIG. 2 is a color profile of champagne green glass prepared by conventional methods utilizing CoO as a colorant. The composition for this conventional champagne green glass is given in Table V. C.I.E. colorimetric data for a sample of 10 mm. thickness of this conventional champagne green composition is as follows:

Dominant wavelength _____ 560.0
Purity, percent _____ 47.2
Brightness, percent _____ 12.05

This comparison clearly demonstrates that we have developed a new composition that exhibits the same optical properties as the standard champagne green composition.

The following table contains the actual composition of the prepared composite glass. This data is presented by way of illustration and need not be interrupted necessarily as a limitation of the invention.

TABLE V

| Constituent of Finished Glass | Conventional Champagne Green Composition | Frit Glass of Ex. III and Base Glass of Table IV | Preferred Range for Composition of Invention |
| --- | --- | --- | --- |
| $SiO_2$ | 71.49 | 71.66 | 60-75 |
| $Al_2O_3$ | 2.01 | 1.55 | 0.3-10 |
| CaO | 10.88 | 12.30 | 6-15 |
| MgO | 0.68 | 0.13 | ---------- |
| $Na_2O$ | 14.34 | 13.55 | 12-18 |
| $K_2O$ | 0.17 | 0.38 | 0-5 |
| $Fe_2O_3$ | 0.169 | 0.040 | (1) |
| $CrO_3$ | None | 0.000 | (2) |
| $Cr_2O_3$ | 0.091 | 0.0615 | 0.05-0.062 |
| CuO | None | 0.100 | 0.05-0.10 |
| NiO | 0.060 | 0.060 | 0.06-0.08 |
| CoO | 0.0046 | None | None. |

1 As low as batch material permit.
2 As low as possible.

It is evident from the foregoing that the present invention provides a new glass composition having optical properties within the commercial specifications of champagne green; a method of preparing said glass composition by the forehearth addition technique and a novel frit glass composition for use in said forehearth technique.

While the preferred embodiments have been described above in detail, it will be understood that numerous modifications might be resorted to without departing from the spirit and scope of the invention as defined in the following claims.

We claim:
1. In a method of making a champagne green soda-lime glass, the steps of preparing a molten colorless soda-lime base glass, flowing the molten base glass through a forehearth, adding to the molten base glass in the forehearth a highly enriched colorant frit consisting essentially of soda-lime flint glass composition containing the following colorants:

Percent
Total chromium as $Cr_2O_3$ _____ 2.1-3.1
CuO _____ 1.8-2.7
NiO _____ 2.6-3.8 and forming a composite champagne green glass, the amount of frit glass added ranging from 1% to 5% by weight of the molten base glass.

2. In a method of making a colored glass composition, the steps of preparing a substantially colorless molten base glass having the following composition:

Oxide: Percent range
$SiO_2$ _____ 60-75
$Al_2O_3$ _____ 0.3-10
CaO+MgO _____ 6-15
$Na_2O$ _____ 12-18
$K_2O$ _____ 0-5
BaO _____ 0-5
Decolorizer _____ Trace and adding to said molten glass a highly colored frit as defined in claim 1 and prepared from a batch of the following proportions by weight:

Ingredients: Parts
Sand _____ 2000
Soda ash _____ 1000-1275
Dehydrated borax _____ 175-270
Potassium dichromate _____ 124-198
Black nickel oxide _____ 82-131
Black copper oxide _____ 56-89 the amount of frit added being sufficient to yield a final colored glass composition containing colorants as follows:

| Oxide: | Percent range |
|---|---|
| $Cr_2O_3$ | 0.005–0.062 |
| CuO | 0.05–0.10 |
| NiO | 0.06–0.08 | and said final glass composition having C.I.E. colorimetric values for 10 millimeter thickness of about 12–20% brightness, 40–50% purity and 560–564 millimicrons dominant wavelength.

3. A frit composition consisting essentially of a soda-lime flint glass which is highly colorant enriched and which consists essentially of the following ingredients in the indicated percentage by weight:

| Ingredient: | Percent by weight |
|---|---|
| $SiO_2$ | 55–67 |
| $Al_2O_3$ | 0–1 |
| $Fe_2O_3$ (impurity) | 0–1 |
| $B_2O_3$ | 2–7 |
| $Na_2O$ | 15–25 |
| $K_2O$ | 0–5 |
| Total Cr as $Cr_2O_3$ | 2.1–3.1 |
| NiO | 2.6–3.8 |
| CuO | 1.8–2.7 |

4. The frit glass as described in claim 3, wherein the specific range of colorants is:

| | Percent |
|---|---|
| $Cr_2O_3$ | 2.3–2.7 |
| $CrO_3$ | 0–0.002 |
| NiO | 2.7–3.2 |
| CuO | 1.8–2.2 |

5. The frit glass as described in claim 3, wherein the specific composition is:

| | Percent |
|---|---|
| $SiO_2$ | 61.9 |
| $Al_2O_3$ | 0.15 |
| $B_2O_3$ | 5.06 |
| $Na_2O$ | 22.45 |
| $K_2O$ | 1.73 |
| Total Cr as $Cr_2O_3$ | 2.80 |
| NiO | 3.50 |
| CuO | 2.43 |

6. The frit glass as described in claim 3, wherein the specific composition is:

| | Percent |
|---|---|
| $SiO_2$ | 66.51 |
| $Al_2O_3$ | 0.16 |
| $B_2O_3$ | 4.05 |
| $Na_2O$ | 21.18 |
| $K_2O$ | 1.36 |
| Total Cr as $Cr_2O_3$ | 2.14 |
| NiO | 2.69 |
| CuO | 1.87 |

7. The frit glass as described in claim 3, wherein the specific composition is:

| | Percent |
|---|---|
| $SiO_2$ | 58.71 |
| $Al_2O_3$ | 0.14 |
| $B_2O_3$ | 5.51 |
| $Na_2O$ | 24.27 |
| $K_2O$ | 1.90 |
| Total Cr as $Cr_2O_3$ | 3.02 |
| NiO | 3.79 |
| CuO | 2.63 |

8. A green soda-lime glass composition consisting essentially of:

| | Percent |
|---|---|
| $SiO_2$ | 60–75 |
| $Al_2O_3$ | 0.3–10 |
| CaO, MgO | 6–15 |
| $Na_2O$ | 12–18 |
| $K_2O$ | 0–5 |
| Total Cr as $Cr_2O_3$ | 0.05–0.062 |
| CuO | 0.05–0.10 |
| NiO | 0.06–0.08 |

9. A glass composition as described in claim 8, wherein the specific composition is:

| | Percent |
|---|---|
| $SiO_2$ | 71.7 |
| $Al_2O_3$ | 1.6 |
| CaO | 12.3 |
| MgO | 0.1 |
| $Na_2O$ | 13.6 |
| $K_2O$ | 0.4 |
| Total Cr as $Cr_2O_3$ | 0.06 |
| CuO | 0.1 |
| NiO | 0.06 |

References Cited

UNITED STATES PATENTS

| Re. 25,456 | 10/1963 | Bacon et al. | 106—52 |
| 2,956,892 | 10/1960 | Duncan | 106—52 |
| 3,024,120 | 3/1962 | Babcock | 106—52 |
| 3,024,121 | 3/1962 | Hagedorn | 106—52 |
| 3,203,816 | 8/1965 | Bull et al. | 106—52 |

HELEN M. McCARTHY, *Primary Examiner.*